US011218985B2

(12) United States Patent
Merkel (10) Patent No.: US 11,218,985 B2
(45) Date of Patent: Jan. 4, 2022

(54) SELF-ORGANIZING NODE AND A SENSOR NETWORK WITH SELF-ORGANIZING NODES

(71) Applicant: Teade OÜ, Tallinn (EE)

(72) Inventor: Harald Merkel, Ringkøbing (DK)

(73) Assignee: Teade OÜ, Tallinn (EE)

( * ) Notice: Subject to any disclaimer, the term of this patent is extended or adjusted under 35 U.S.C. 154(b) by 4 days.

(21) Appl. No.: 16/770,163

(22) PCT Filed: Dec. 6, 2018

(86) PCT No.: PCT/EP2018/083805
§ 371 (c)(1),
(2) Date: Jun. 5, 2020

(87) PCT Pub. No.: WO2019/110733
PCT Pub. Date: Jun. 13, 2019

(65) Prior Publication Data
US 2020/0396707 A1 Dec. 17, 2020

(30) Foreign Application Priority Data

Dec. 6, 2017 (SE) .................................. 1751501-6

(51) Int. Cl.
*H04W 56/00* (2009.01)
*G01S 15/08* (2006.01)
*H04W 84/18* (2009.01)

(52) U.S. Cl.
CPC ........... *H04W 56/005* (2013.01); *G01S 15/08* (2013.01); *H04W 56/006* (2013.01); *H04W 56/0065* (2013.01); *H04W 84/18* (2013.01)

(58) Field of Classification Search
CPC ............. H04W 56/005; H04W 56/006; H04W 56/0065; H04W 84/18; G01S 15/08; G01S 15/74; G01S 15/876
See application file for complete search history.

(56) References Cited

U.S. PATENT DOCUMENTS 6,493,649 B1 * 12/2002 Jones ...................... G01S 5/186
367/99
6,615,030 B1 * 9/2003 Saito .................. H04B 1/71075
375/349

(Continued)

FOREIGN PATENT DOCUMENTS

CN 103796338 A 5/2014
CN 106291468 B 1/2017

(Continued)

*Primary Examiner* — Stephen J Clawson
(74) *Attorney, Agent, or Firm* — Capitol City TechLaw (57) ABSTRACT

A node transmits/receives signals over first and second communication channels having non-equal propagation speeds. When node identifies reset signal received over first communication channel, it adjusts internal clock, transmits acknowledgement signal and initiates acknowledgement process. When reset signal not identified, node transmits reset signal over first communication channel and receives response signal from one node. If response signal is acknowledgement signal, acknowledgement process is initiated. If response signal is non-acknowledgement signal, internal clock is adjusted and acknowledgement process is initiated. In acknowledgement process, node determines distance to other nodes by measuring travelling time for signal over second communication channel exchanges distance information with other nodes, and fine tunes internal clock of each node when transmitting over first communication channel. Node's transceiver circuitry has radio frequency part to transmit/receive electromagnetic signals and acoustic part to transmit/receive acoustic signals. Each node determines distance in acknowledgement process.

15 Claims, 3 Drawing Sheets

(56) References Cited

U.S. PATENT DOCUMENTS

| | | | | |
|---|---|---|---|---|
| 8,325,704 | B1 * | 12/2012 | Lemkin | H04J 3/0667 |
| | | | | 370/350 |
| 8,798,638 | B2 * | 8/2014 | Lane | H04W 4/029 |
| | | | | 455/456.1 |
| 9,160,519 | B1 * | 10/2015 | Leong | H04W 12/06 |
| 10,120,641 | B2 * | 11/2018 | Lay | H04L 7/0016 |
| 10,218,408 | B1 * | 2/2019 | Shaffer | H04B 7/18513 |
| 2002/0184208 | A1 * | 12/2002 | Kato | G06F 16/258 |
| 2005/0221829 | A1 * | 10/2005 | Nishida | G01S 11/06 |
| | | | | 455/440 |
| 2009/0141666 | A1 * | 6/2009 | Jin | H04B 7/2606 |
| | | | | 370/315 |
| 2017/0052247 | A1 | 2/2017 | Kong et al. | |
| 2020/0229124 | A1 * | 7/2020 | Soriaga | H04W 4/023 |

FOREIGN PATENT DOCUMENTS

| | | | |
|---|---|---|---|
| WO | 20140680881 | A1 | 5/2014 |
| WO | 2015092825 | A1 | 6/2015 |

* cited by examiner

SELF-ORGANIZING NODE AND A SENSOR NETWORK WITH SELF-ORGANIZING NODES

This application claims priority under 35 USC 119(a)-(d) from SE patent application No. 1751501-6 filed Dec. 6, 2017, the entire content of which is incorporated herein by reference.

TECHNICAL FIELD

The present invention relates to a node adapted to be used in a sensor network, especially radar applications. The invention further relates a sensor network, a method for determining distance between nodes in a sensor network, a computer program and a computer-readable storage medium.

BACKGROUND

Sensor networks, such as radar, constitute an object-detection system that uses radio waves to determine range, angle, or velocity of objects. It can be used to detect aircraft, ships, spacecraft, guided missiles, motor vehicles, weather formations, and terrain. A basic radar system consists of a transmitter producing electromagnetic waves in the radio or microwaves domain, an emitting antenna, a receiving antenna (separate or the same as the previous one) to capture any returns from objects in the path of the emitted signal, a receiver and processor to determine properties of the object(s).

In order to increase the resolution in radar systems operating in HF and VHF frequency range (3-300 GHz), array antennas are commonly used. There are two properties to characterize array antenna. The first characterization parameter groups arrays in regular and irregular arrays depending on if the antenna position is periodic or not. The second classification parameter is if the array does not exhibit grating lobes (where the distance between the arrays is less than half a wavelength, referred to as "filled array") or not (referred to as "sparse array").

For an irregular sparse array antenna, each distance between the antenna elements in the array antenna is essential to determine the properties of the object(s) detected by the radar system. This is especially true when having a large array antenna with separate antenna elements distributed over several square kilometres.

A fundamental problem with large and sparse array antennas is that the position of each antenna element has to be known. Any change of position (e.g. during operation) must be input to the signal processing algorithm in order to be able to generate radar images.

In CN 106291468 A, a positioning system using ultrasonic waves and radio frequency waves is disclosed. The purpose is to establish the position of an UE inside a building using beacon nodes which are fixed and known in relation to each other.

In CN 103796338 A, a wireless sensor component and TDMA self-organizing network is disclosed. The reachable synchronization accuracy between nodes in the network is within microseconds and depends on the chosen hardware. This accuracy is by no means sufficient for large array antenna formation.

WO2015092825 A1 discloses a method for short-range localization of active objects using associated communication means and passive objects without communication means. The method uses both radio ranging and ultrasonic ranging in order to determine presence and distance within and with respect of a network of anchor nodes.

US20170052247 A1 discloses a radar imaging system comprising a radar transmitter configured to transmit radar at a target, an aperture comprising an array of physically independent airborne carriers, each configured to receive radar echoes from the target, and a base station in communication with each of the airborne carriers.

SUMMARY

An object with the present invention is to provide a sensor network that eliminates, or at least reduces, one or more of the above identified drawbacks.

The object is achieved by a node for use in a sensor network together with at least one other node, wherein the node comprises: an internal clock, a transceiver circuitry configured to transmit and receive signals over at least a first communication channel and a second communication channel with non-equal speed of propagation, i.e. different from the first channel, over at least one antenna element, and a processor. The node is configured to identify if a reset signal has been received over the first communication channel, and when the reset signal has been identified, the node is further configured to adjust the internal clock based on the reset signal, transmit an acknowledgement signal in response to the received reset signal and initiate an acknowledgement process, or when the reset signal has not been identified, the node is further configured to transmit the reset signal over the first communication channel and receive a response signal in response to the transmitted reset signal from at least one of the at least one other node, and if the response signal is an acknowledgement signal, the node is further configured to initiate an acknowledgement process, or if the response signal is a non-acknowledgement signal, the node is configured to adjust the internal clock based on the received non-acknowledgement signal and initiate an acknowledgement process.

In order to perform the acknowledgement process, the node is further configured to determine a distance to the at least one other node by measuring the travelling time for a signal over the second communication channel, exchange distance information with the at least one other device, and fine tune the internal clock of each device based on the distance information when transmitting over the first communication channel.

The object is also achieved by a sensor network as defined in independent claim 9 and a method as defined in independent claim 14.

An advantage with the present invention is that it is not necessary to know the position of the antenna elements in each node before the sensor network is initiated.

Another advantage is that if a node is moved (or removed/added to the array of nodes in the sensor network) the position of the nodes will be updated and the number of nodes in the array will be adjusted when a node is removed or added. Thus, a flexible self-organizing sensor network is achieved.

Another advantage is that the sensor network is not wind or in other way displacement sensitive provided the position of each node is sufficiently fast updated.

Further objects and advantages may be obtained from the detailed description by a skilled person in the art.

DETAILED DESCRIPTION

The disclosure relates to nodes that together creates a sensor network, e.g. for use in radar systems, using the antenna elements in each separate node as antenna elements in an array antenna configuration. One of the fundamental aspects with antenna arrays is that the distance between each antenna element has to be known in order to synchronize signals communicated via the antenna array.

As previously mentioned, CN 106291468 discloses a positioning system using waves propagating with different speed (ultrasonic waves and radio frequency waves) to establish the position of an UE indoors. The beacon nodes are fixed in relation to each other and at least three beacon node are required to be able to establish the position an UE illustrated by a filled circle in FIG. 1 of D1. This fact is also supported by the mathematical explanation in paragraph [0048].

However, when the position between the nodes is unknown, a different approach is required as illustrated below.

Figure 1:
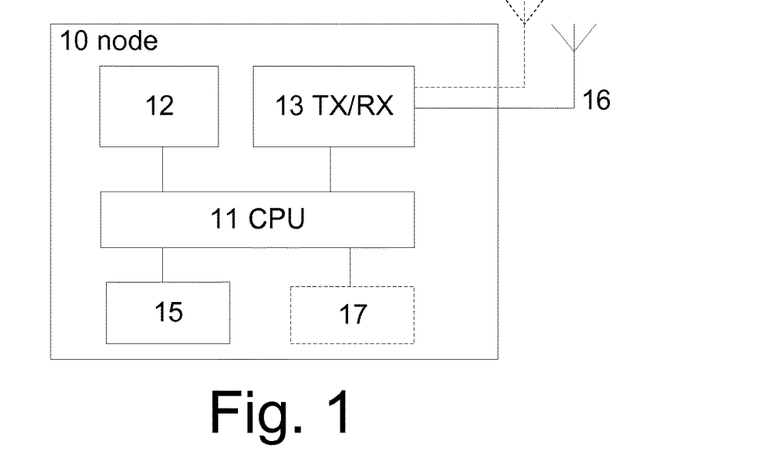
FIG. 1 illustrates a node for use in a sensor network.

FIG. 1 illustrates a node 10, for use in a sensor network, comprising a processor CPU 11, an internal clock 12, a memory 15, a transceiver circuitry TX/RX 13, an optional energy source 17 and one or more antennas 16. Each node 10 is preferably self-sufficient, which means that the node 10 is operational as long as the energy source 17 provides power to the radar device, alternatively the node 10 may be connected to a power mains.

The transceiver circuitry 13 is configured to transmit and receive signals over at least a first communication channel and a second communication channel with non-equal speed of propagation, over at least one antenna element 16. according to one aspect, the transceiver circuitry 13 consists of a radio frequency (RF) part being able to transmit and receive electromagnetic signals and an acoustic (US) part being able to transmit and receive acoustic signals (e.g. ultrasound).

The node 10 is configured to identify if a reset signal has been received over the first communication channel. According to some aspect, the speed of propagation for the first communication channel is higher than the speed of propagation for the second communication channel, and thereby allowing to extract distance information based on multipath or multi-medium data transfer.

According to some aspect, the speed of propagation for the first communication channel, e.g. microwave signals adapted for radar applications, is more than thousand times higher than the speed of propagation for the second communication channel, e.g. ultrasonic signals, allowing the assumption of <0.1% error when transferring the reset signal over the second communication channel compared to when the reset signal is transferred via the first communication channel.

According to some aspects, the speed of propagation of the first communication channel is less than ten million times higher than the speed of propagation of the second communication channel.

As an example, the first communication channel is configured to be used for radar application operating at a speed of propagation of 299 792 458 m/s and the second communication channel is configured to be used for ultrasonic or acoustic applications operating at a speed of propagation of 330 m/s, thus approximately one million times slower than the speed of propagation for the first communication channel.

Alternatively, different media may be used to achieve difference in speed of propagation. For instance, velocity of sound through a given medium is inversely related to the density and directly related to stiffness of that medium. Ultrasound waves travel faster through a stiff medium, such as water or stone. Sound waves travel through the air with speed of 330 m/s, and the velocity of sound in water is 1480 m/s.

When the reset signal has been identified in the node 10, the node is operating in a target node mode and is further configured to adjust the internal clock 12 based on the reset signal, transmit an acknowledgement signal in response to the received reset signal and initiate an acknowledgement process. The adjustment of the internal clock 12 is a coarse reset (to the accuracy of the slower channel) and may include a hard reset of the clock to "0000" to course synchronize the internal clock of the node transmitting the reset signal with the node receiving the reset signal.

In the case when the reset signal has not been identified in the node 10, the node is operating in a source node mode and is further configured to transmit the reset signal over the first communication channel, e.g. a microwave signal, and receive a response signal in response to the transmitted reset signal from at least one of the at least one other node, and two types of response signals may be received:

Acknowledgement Signal

If the response signal is an acknowledgement signal, the node (10) is further configured to initiate an acknowledgement process. This is the case when the node was the first to transmit a reset signal to the node that sends an acknowledgement signal in response.

Non-Acknowledgement Signal

If the response signal is a non-acknowledgement signal (i.e. any type of signal not being an acknowledgement signal), the node is configured to adjust the internal clock based on the received non-acknowledgement signal and initiate an acknowledgement process. The adjustment of the internal clock 12 is a coarse reset and may include a hard reset of the clock to "0000" to course synchronize the internal clock of the node transmitting the non-acknowledgement signal with the node receiving the non-acknowledgement signal. This is typically the case, when a node is not the first to transmit a reset signal, and therefore will not receive an acknowledgement signal. The node will interpret the non-acknowledgement signal to be a reset signal from another node and adjust the internal clock accordingly before initiating the acknowledgement process.

According to some aspects, the acknowledgement signal and/or non-acknowledgement signal is/are communicated over the first communication channel.

In order to perform the acknowledgement process, the node 10 is further configured to determine a distance to the at least one other node by measuring the travelling time for a signal over the second communication channel, exchange distance information with the at least one other device, and fine tune the internal clock of each device based on the distance information when transmitting over the first communication channel.

Description of how to determine the distance between nodes is illustrated in connection with FIG. 4.

Figure 2A:
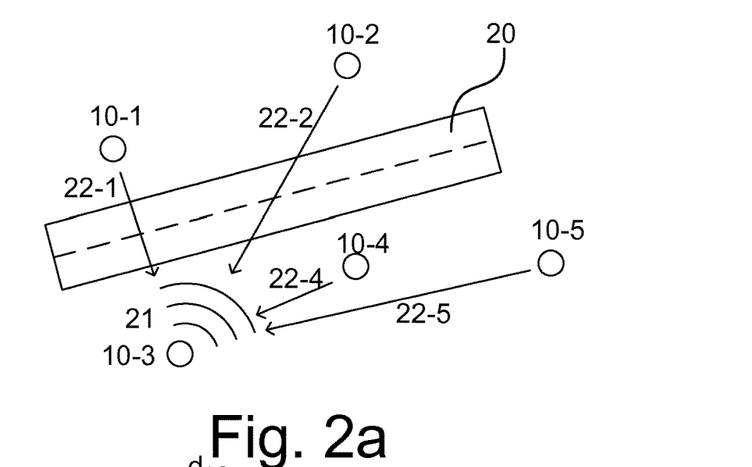
FIG. 2a illustrates the initiation of a sensor network

FIG. 2a illustrates the initiation of a sensor network comprising a plurality of nodes. This process may be illustrated in a number of steps.

1) One randomly chosen node, e.g. 10-3, broadcasts a reset signal 21 over the first communication channel containing a command to reset the internal clock in all other nodes. In an example embodiment, the reset signal travels with a velocity of $3 \cdot 10^8$ m/s. This notion does not imply a manual choice or selection process. Each node possesses a unique identity e.g. in the form of a large binary string that is set during production. On each node, random numbers are generated using the identity as seed variable. This random number is translated to a waiting time until this node will transmit the reset command—unless no reset command of another node is received (e.g. by a suitable modulo operation and added pseudorandom procedures). One node will have the smallest random number resulting in the least waiting time. This node will be powered up first acting for a time master "pares inter paribus". In case of simultaneously sent reset commands, the node chooses the next random number until one single reset command is issued by exactly one node. According to some aspects, the reset signal comprises the unique identity of the transmitting node.

2) This reset signal is received at the other nodes, e.g. 10-1, 10-2, 10-4 and 10-5, and their respective internal clock is reset to coarse adjust the clocks to the internal clock of 10-3.

3) Each node broadcasts their respective identity as an acknowledgement signal 22-1, 22-1, 22-4 and 22-5. This acknowledgement telegram is sent after an individually randomized delay. This ensures the telegrams to arrive—statistically after a finite amount of trials—one by one at receive sections of the nodes. It should be noted that the signal transmitted from each node is received by all nodes (although the figure only illustrate an arrow to the node 10-3 that transmitted the reset signal), and thereby to inform the nodes in the network of each respective identity.

At this point, the identities of all nodes within communication reach are known to all nodes, and all internal clocks are coarsely adjusted to each other. However, the time difference between the nodes is determined by the still unknown travel time between the nodes.

Figure 2B:
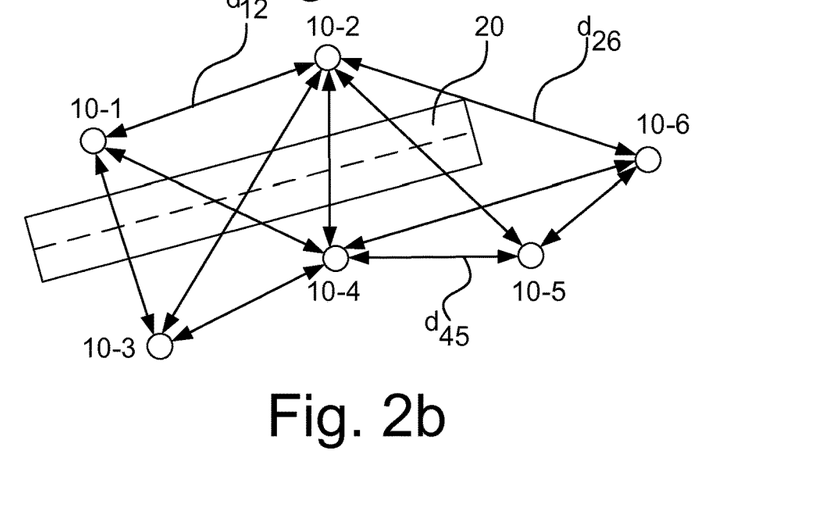
FIG. 2b illustrates determining distances between nodes in the sensor network.

FIG. 2b illustrates the process to determine the distance between the nodes in the network 4) All nodes start to transmit signals over the second communication channel to each of the nodes with a known identity. According to some aspects the signal is transmitted with a low velocity, e.g. 330 m/s. The addressed node returns the signal adding information about its own processing time, as described in connection with FIG. 4. From this roundabout time, the distances between each node and the other nodes are calculated.

5) Information regarding the distances between the nodes is mutually exchanged between the nodes by signalling and the distance data between two nodes, e.g. $d_{12}$, is broadcasted to the other nodes. At this point all nodes possess information on the distances between all other nodes. According to some aspects, the information regarding the nodes within reach is required and saved in the respective nodes.

6) Starting from node 10-3, the internal clocks of the nodes within range of 10-3 are adjusted: The clock reading is subtracted by the radar travelling time which is determined by the now known distance to node 10-3. This process is referred to as fine tuning of the clock. Nodes that have successfully undergone fine tuning repeat the same process to nodes in their range. Repeating this process, all nodes of the radar system will have clocks ideally synchronous to 10-3.

Thus, the antenna array of the sensor network is now ready for use in different applications, e.g. a radar imaging process may be initiated by radar node 10-3. Subsequently, absolute synchronous antenna structures of arbitrary size are created as used for high resolution object detection e.g. to identify and predict birds at an airport or as means to measure quantum entanglement over large distances or to evaluate Einstein-Podolsky-Rosen problems.

According to some aspects, steps 1-6 are regularly repeated to update the distance information between the nodes in the sensor network if needed.

Figure 3:
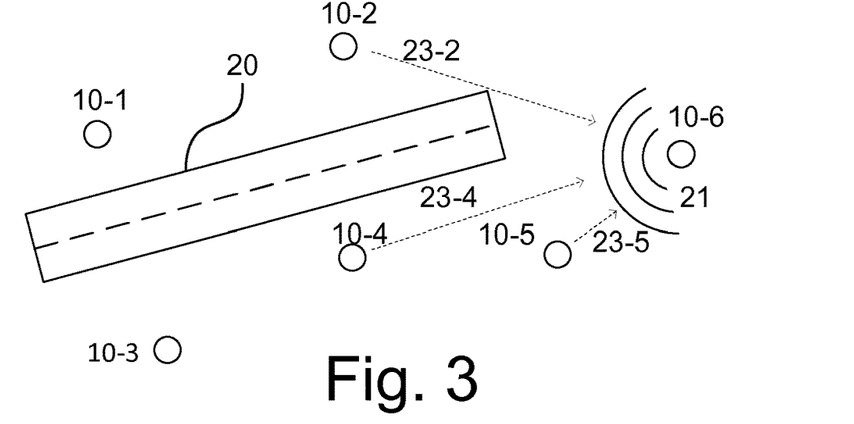
FIG. 3 illustrates the expanding of the sensor network by adding nodes.

FIG. 3 illustrates the expanding of the sensor network by adding nodes. When a new node 10-6 is introduced into a sensor network, the node is listening to identify if a reset signal has been transmitted by another node. If a reset signal has been identified, the new node 10-6 will transmit an acknowledgement signal in response to the received reset signal and the acknowledgement process is performed for the new node according to steps 2-6 above.

However, if no reset signal is detected with a predetermined time interval based on the identity (as described in step 1) the new node transmits a reset signal 21 which in this example is received by neighbouring nodes 10-2, 10-4 and 10-5. Each neighbouring node transmits a non-acknowledgement signal 23 in response to the reset signal and the new node 10-6 adjusts the internal clock based on information provided in the received non-acknowledgement signal and initiate an acknowledgement process as described in steps 4-6. According to some aspects, the non-acknowledgement signal comprises: the identity of the transmitting node, and information to adjust the clock to the internal clock of the transmitting node.

Figure 4:
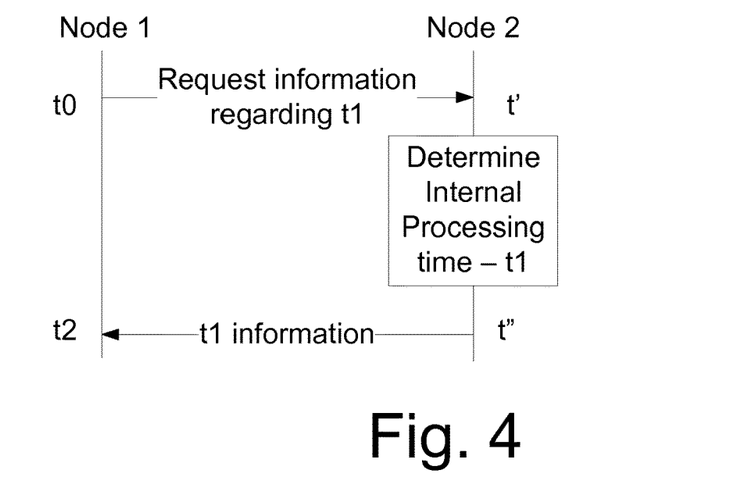
FIG. 4 illustrates an example to determine distance between two nodes.

FIG. 4 illustrates an example to determine distance between two nodes, in this example denoted Node 1 and Node 2. A signal is transmitted from Node 1 requesting information regarding the internal processing time $t_1$ in Node 2. The signal is transmitted at time=t0 and information regarding the internal processing time $t_1$ in Node 2 is received at time $t_2$. Node 2 receives the request at time t' and transmits information back to Node 1 at time t", which means that the internal processing time $t_1 = t'' - t'$. The information received in Node 1 at time $t_2$ comprises the internal processing time $t_1$ and the travelling time $t_{travel}$ between the nodes may be determined by:

$$t_{travel} = (t_2 - t_0 - t_1)/2, \text{ wherein } t_1 = t'' - t'$$

Thereby identifying the distance between the nodes when the propagation speed of the signal is known.

Thus, according to some aspects, each node 10 is configured to determine the distance in the acknowledgement process by transmitting a signal to a specific node and receive a return signal with information regarding internal processing time $t_1$ in the addressed node, thereby calculating the distance based on the travelling time $t_{travel}$.

This disclosure is also related to a sensor network comprising a plurality of nodes with the functionality as described above. Each node has a unique identity, is located at arbitrary distance from each other, and comprises a processor, a memory, an internal clock, a transceiver circuitry and at least one antenna element. At least one of the plurality of nodes is configured to transmit a reset signal over a first communication channel, and the nodes are informed of the unique identity of each node by an acknowledgement signal transmitted in response to the reset signal. It is sufficient that one node in the sensor network is configured to transmit a reset signal, and according to some aspects all nodes will have the possibility.

Furthermore, each node is configured to determine distance to neighbouring nodes by measuring the travelling time for a signal over the second communication channel, and mutually exchange distance information between the plurality of nodes, and the at least one of the plurality of nodes is further configured to fine adjust the internal clock based on the distance information.

According to some aspects, all of the plurality of nodes are configured to transmit the reset signal over the first communication channel.

If more than one of the nodes are configured to transmit a reset signal, the node transmitting is randomly selected based on the unique identity of each node, as described above. Furthermore, each node may be configured to transmit its unique identity when transmitting the reset signal.

The acknowledgement signal may be transmitted over any communication channel as long as the signal reaches the node that transmitted the reset signal. According to some aspects, the acknowledgement signal is transmitted over the first communication channel.

Figure 5:
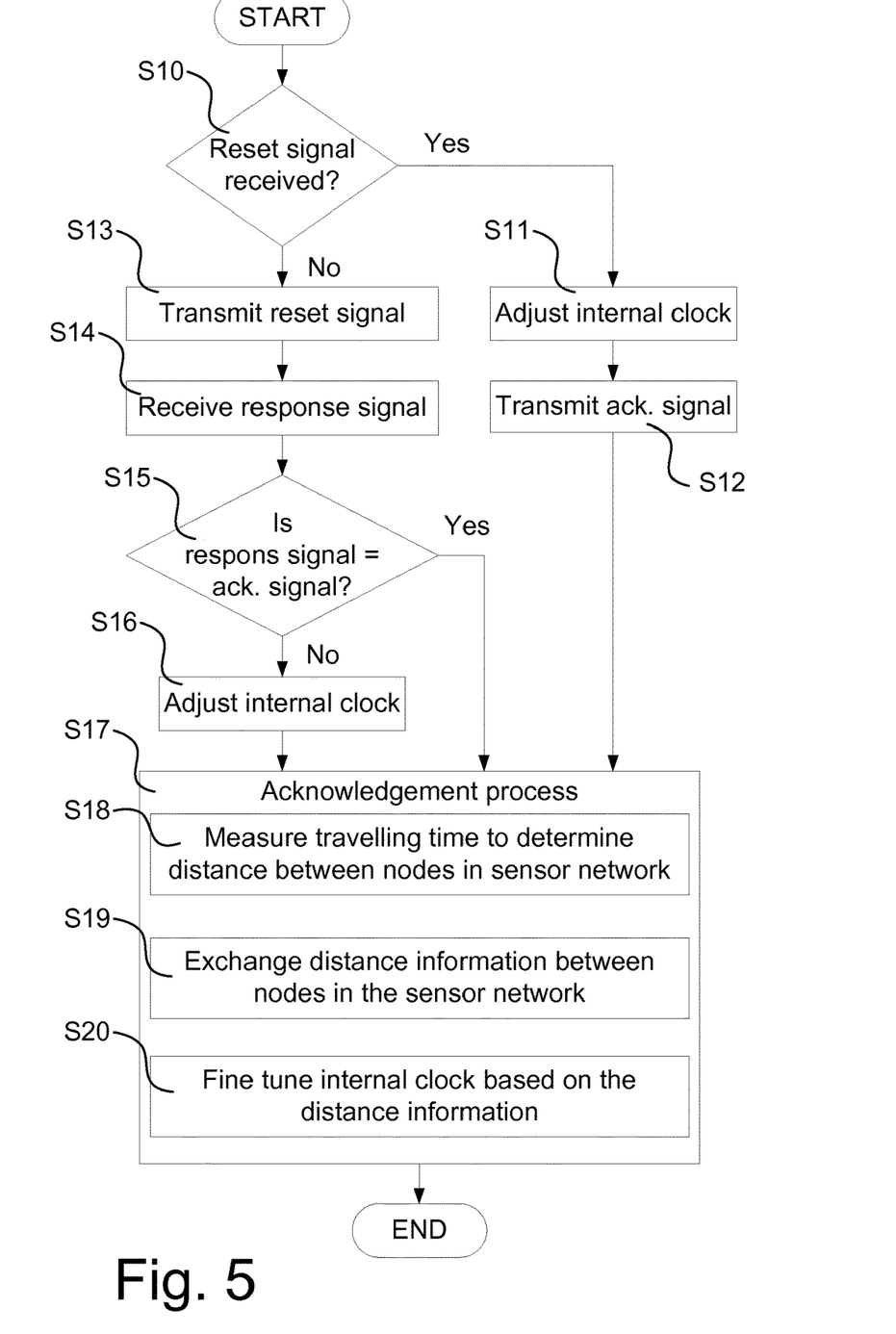
FIG. 5 is a flowchart illustrating the process of setting up a sensor network.

FIG. 5 is a flowchart illustrating a process performed in a node. The purpose of the process is to determine the distance between nodes in a sensor network comprising a plurality of nodes. Each node having a unique identity and the nodes being located at arbitrary distance from each other, and each node comprises a processor, a memory, an internal clock, a transceiver circuitry configured to transmit and receive signals over at least a first communication channel and a second communication channel with non-equal speed of propagation over at least one antenna element.

The first step in the process is identifying S10 if a reset signal has been received over the first communication signal, and when the reset signal has been identified, the process continues with adjusting S11 the internal clock based on the reset signal, transmitting S12 an acknowledgement signal in response to the received reset signal and thereafter initiating an acknowledgement process (described in connection with step S17).

On the other hand when a reset signal has not been identified, the process continues with transmitting S13 the reset signal over the first communication channel and receiving S14 a response signal in response to the transmitted reset signal from at least one of the at least one of the plurality of nodes.

If the response signal is an acknowledgement signal, the process continues with initiating an acknowledgement process (described in connection with step S17), or if the response signal is a non-acknowledgement signal, the process continues with adjusting S16 the internal clock based on the received non-acknowledgement signal and initiating an acknowledgement process (described in connection with step S17).

The nodes in the network exchange information regarding their identity, either simultaneously with transmitting the reset signal and response signals (acknowledgement/non-acknowledgement signals) or using separate communication when coarse adjustment of the internal clock has been achieved. At this point, the identities of all nodes within reach of communication are known to the node, and all internal clocks are coarsely adjusted to each other. However, the time difference between the nodes is determined by the still unknown travel time between the nodes.

The process continues with performing S17 the acknowledgement process for each node within reach, which comprises three steps:
  determining S18 a distance to one of the plurality of nodes by measuring the travelling time for a signal over the second communication channel,
  exchanging S19 distance information with one of the plurality of nodes, and
  fine tuning S20 the internal clock of each node based on the distance information when transmitting over the first communication channel.

The above described process in the flow chart may be implemented as a computer program for determining distance between nodes in a sensor network, comprising instrutions which, when executed on at least one processor, cause the at least one processor to carry out the method comprising at least:
  identifying S10 if a reset signal has been received over the first communication signal, and
  when the reset signal has been identified, adjusting S11 the internal clock based on the reset signal, transmitting S12 an acknowledgement signal in response to the received reset signal and initiating an acknowledgement process, or
  when the reset signal has not been identified, transmitting S13 the reset signal over the first communication channel and receiving S14 a response signal in response to the transmitted reset signal from at least one of the at least one of the plurality of nodes, and
    i) if the response signal is an acknowledgement signal, initiating an acknowledgement process, or
    ii) if the response signal is a non-acknowledgement signal, adjusting S16 the internal clock based on the received non-acknowledgement signal and initiating an acknowledgement process,
wherein the method further comprises:
  performing S17 the acknowledgement process by:
    determining S18 a distance to one of the plurality of nodes by measuring the travelling time for a signal over the second communication channel,
    exchanging S19 distance information with one of the plurality of nodes, and
    fine tuning S20 the internal clock of each node based on the distance information when transmitting over the first communication channel.

The computer program for determining distance between nodes in a sensor network as defined above may be accessed from a computer-readable storage medium, such as a memory, CD, DVD, carrying the computer program.

Figure 6:
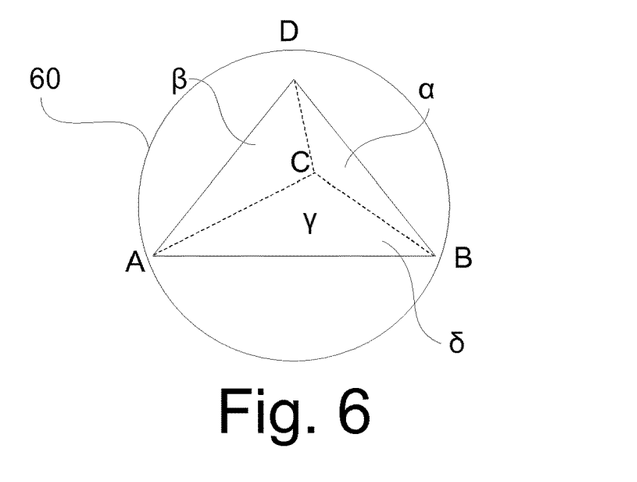
FIG. 6 illustrates an example embodiment of a node with multiple antenna surfaces.

FIG. 6 illustrates an example embodiment of a spherical node 60 with multiple antenna surfaces $\alpha$, $\beta$, $\gamma$ and $\delta$, respectively. In addition to the antenna surfaces, the spherical node 60 further comprises a processor CPU, an internal clock, a memory, a transceiver circuitry TX/RX, an optional energy source. However, only the antenna surfaces are illustrated in FIG. 6.

As the node is formed as a sphere, this means that the orientation of the antenna surfaces is arbitrary, and may differ depending on the position when the node is activated. According to some aspects, the node is configured to select one or more antenna surfaces for transmitting and receiving signals based on the orientation of the antenna surfaces. By selecting antenna surfaces with good transmitting/receiving characteristics, power consumption is reduced which increases the operational time of the node when operating on a local energy source (such as a battery).

The invention claimed is:

1. A node for use in a sensor network together with at least one other node, each node having at least one antenna element configured to be used as an antenna element in an array antenna, the node comprising:
   an internal clock;
   a transceiver circuitry configured to transmit and receive signals over at least a first communication channel and a second communication channel with non-equal speed of propagation, over the at least one antenna element; and
   a processor;
   wherein the node is configured to identify if a reset signal has been received over the first communication channel, and
   when the reset signal has been identified, the node is further configured to
   a) adjust the internal clock based on the reset signal, transmit an acknowledgement signal in response to the received reset signal, and initiate an acknowledgement process, or
   when the reset signal has not been identified, the node is further configured to
   b) transmit the reset signal over the first communication channel and receive a response signal in response to the transmitted reset signal from the at least one other node, and
   b1) if the response signal is an acknowledgement signal, the node is configured to initiate an acknowledgement process, or
   b2) if the response signal is a non-acknowledgement signal, the node is configured to adjust the internal clock based on the received non-acknowledgement signal and initiate the acknowledgement process; and
   wherein, to perform the acknowledgement process, the node is further configured to
   c) determine a distance to the at least one other node by measuring a travelling time for a signal over the second communication channel, exchange distance information with the at least one other node, and fine tune the internal clock of each node based on the distance information when transmitting over the first communication channel.

2. The node according to claim 1, wherein the speed of propagation for the first communication channel is higher than the speed of propagation for the second communication channel.

3. The node according to claim 2, wherein the speed of propagation for the first communication channel is more than one thousand times higher than the speed of propagation for the second communication channel.

4. The node according to claim 2, wherein the speed of propagation for the first communication channel is less than ten million times higher than the speed of propagation for the second communication channel.

5. The node according to claim 1, wherein the first communication channel is configured to be used for radar applications.

6. The node according to claim 1, wherein the second communication channel is configured to be used for ultrasonic or acoustic applications.

7. The node according to claim 1, wherein the acknowledgement signal is communicated over the first communication channel.

8. The node according to claim 1, wherein the distance in step c) is determined by transmitting a signal to a specific node and receiving a return signal with information regarding internal processing time in an addressed node, thereby calculating the distance based on the travelling time.

9. A sensor network comprising a plurality of nodes according to claim 1, each node having at least one antenna element configured to be used as an antenna element in an array antenna, a unique identity, and the nodes being located at an arbitrary distance from each other, wherein each node comprises a processor, a memory, an internal clock, a transceiver circuitry, and the at least one antenna element, wherein at least one of the plurality of nodes is configured to transmit a reset signal over a first communication channel, and wherein the nodes are informed of the unique identity of each node by an acknowledgement signal transmitted in response to the reset signal;
   wherein each node is configured to determine a distance to neighboring nodes by measuring a travelling time for a signal over the second communication channel, and mutually exchange distance information between the plurality of nodes; and
   wherein the at least one of the plurality of nodes is further configured to fine adjust the internal clock based on the distance information.

10. The sensor network according to claim 9, wherein all of the plurality of nodes are configured to transmit a reset signal over the first communication channel.

11. The sensor network according to claim 9, wherein each node configured to transmit the reset signal is further configured to transmit its unique identity when transmitting the reset signal.

12. The sensor network according to claim 9, wherein the acknowledgement signal is transmitted over the first communication channel.

13. The sensor network according to claim 9, wherein the at least one of the plurality of nodes transmitting the reset signal is randomly selected based on the unique identity of each node.

14. A method in a node for determining distance between nodes in a sensor network comprising a plurality of nodes, each node having at least one antenna element configured to be used as an antenna element in an array antenna, a unique identity, and the nodes being located at an arbitrary distance from each other, wherein each node comprises a processor, a memory, an internal clock, and a transceiver circuitry configured to transmit and receive signals over at least a first communication channel and a second communication channel with non-equal speed of propagation over the at least one antenna element, the method comprising:
   identifying if a reset signal has been received over the first communication channel; and
   when the reset signal has been identified, adjusting the internal clock based on the reset signal, transmitting an acknowledgement signal in response to the received reset signal, and initiating an acknowledgement process, or
   when the reset signal has not been identified, transmitting the reset signal over the first communication channel and receiving a response signal in response to the transmitted reset signal from at least one of the plurality of nodes; and
   i) if the response signal is an acknowledgement signal, initiating the acknowledgement process, or
   ii) if the response signal is a non-acknowledgement signal, adjusting the internal clock based on the received non-acknowledgement signal and initiating the acknowledgement process;
wherein the acknowledgement process involves,
determining a distance to one of the plurality of nodes by measuring a travelling time for a signal over the second communication channel;
exchanging distance information with one of the plurality of nodes; and
fine tuning the internal clock of each node based on the distance information when transmitting over the first communication channel.

15. A non-transitory computer storage medium storing instructions for determining distance between nodes in a sensor network, the instructions which, when executed on at least one processor, cause the at least one processor to carry out the method according to claim 14.

* * * * *